United States Patent

[11] 3,576,346

| [72] | Inventor | Seymour M. Hutchinson<br>Plainview, N.Y. |
|---|---|---|
| [21] | Appl. No. | 832,934 |
| [22] | Filed | June 13, 1969 |
| [45] | Patented | Apr. 27, 1971 |
| [73] | Assignees | Adrian N. Spitz<br>Massapequa,<br>fractional part interest to each;<br>I. Jordan Kunik<br>New York, N.Y., fractional part interest to each |

[54] AUTOMOBILE SAFETY BELT RETAINER
7 Claims, 7 Drawing Figs.

[52] U.S. Cl. .................................................. 297/385
[51] Int. Cl. ..................................................... A62b 35/60
[50] Field of Search .......................................... 297/385,
388, 384; 280/150(SB)

[56] References Cited
UNITED STATES PATENTS

| 2,963,080 | 12/1960 | Zang ........................... | 297/388 |
| 2,964,100 | 12/1960 | McCall ......................... | 297/388 |
| 3,147,995 | 9/1964 | Bohlin .......................... | 297/385 |
| 3,178,222 | 4/1965 | Anderson et al. ............. | 297/385 |
| 3,228,726 | 1/1966 | Petersen ....................... | 297/385 |
| 3,330,599 | 7/1967 | Inoue ........................... | 297/388 |

*Primary Examiner*—James T. McCall
*Attorney*—I. Jordan Kunik

ABSTRACT: Automobile seatbelt retaining device for preventing complete retraction of belt buckle and belt clamp from top of automobile seat and out of reach of the passenger.

PATENTED APR 27 1971
3,576,346
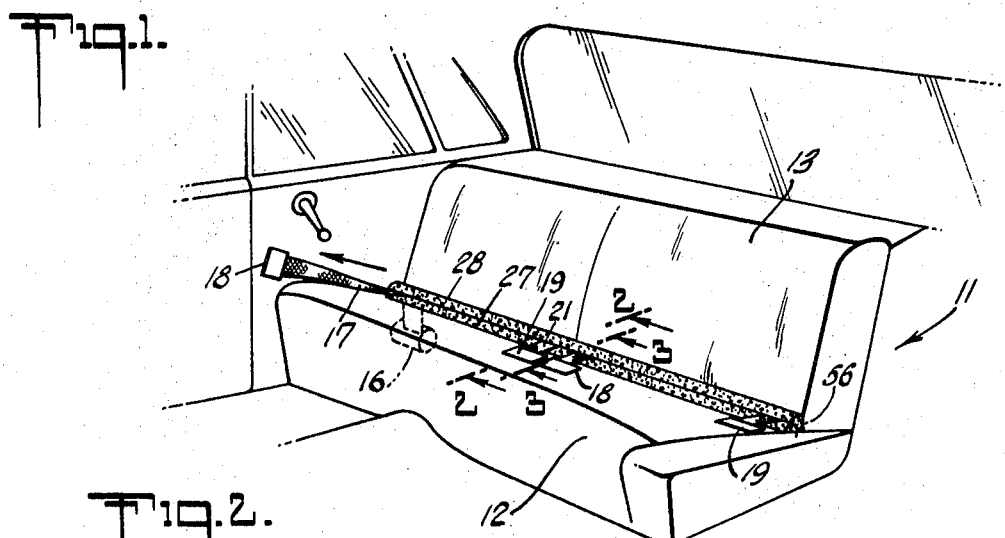
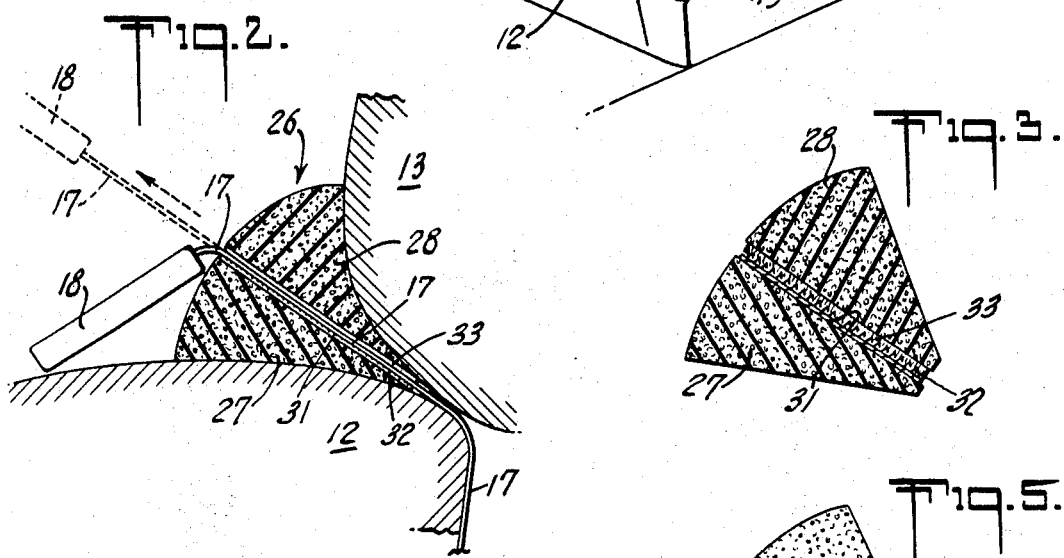
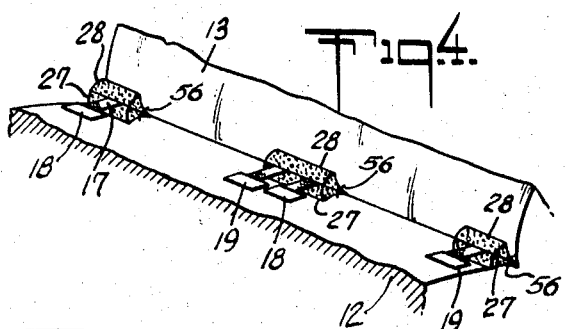
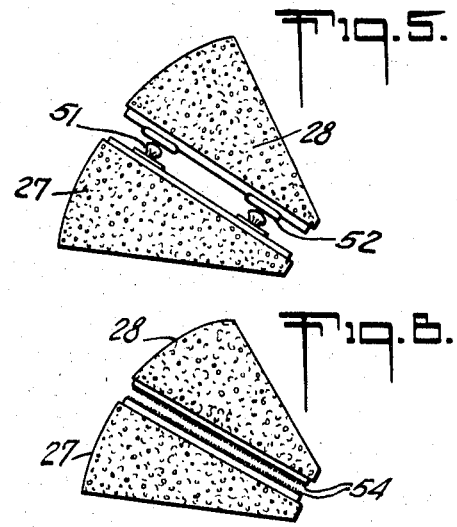
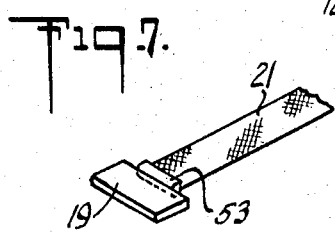
INVENTOR
SEYMOUR M. HUTCHINSON
BY
ATTORNEY

AUTOMOBILE SAFETY BELT RETAINER

BACKGROUND OF THE INVENTION

1. Field of the Invention

This invention relates to automobile safety belts and, more particularly, to retaining devices for preventing the retraction or escape of the seatbelt straps and their corresponding buckles and coupler plates into locations where they are inaccessible to the automobile passenger.

2. Description of the Prior Art

The usefulness of automobile safety belts is affected to a considerable degree by the accessibility of the belt buckles and belt coupler plates to the passenger, and such usefulness has been, in many cases, frustrated by the fact that said belt buckles and belt coupler have been retracted beyond reach of the passenger into the crevice between the automobile seat and the seat back. This problem is of considerable seriousness, especially in the case of safety belts that are mounted and used in the rear seats of automobiles where frequently the retracting coil or the weight of the strap causes the belt buckle or coupler plate to be pulled down into the rear of the car behind the seat and below the seat back out of reach of the passenger.

SUMMARY OF THE INVENTION

The purpose of the present invention is to overcome the foregoing disadvantages by providing means to retain the safety belts of the automobile within easy access to the passenger on the top of the seat and preventing the belt buckle and belt clamp from disappearing into the crevice behind the juncture of the rear of the seat and the bottom of the seat back. This circumstance prevails frequently because of the fact that the automobile seat is usually movable in relation to the seat back and there is no means for preventing various objects from escaping into the area behind the seat.

Accordingly, the present invention contemplates the provision of a pair of resilient elements that fit by wedging action into the juncture between the back of the automotive seat and the bottom of the seat back, said retaining element having two releaseably engaged components which permit the sliding movement of a seatbelt strap therebetween for retraction and adjustment purposes but which do not permit the escape of the seatbelt buckle or coupler plate therebetween into the inaccessible area behind the seat. Also, according to the present invention, the device may be made of comparatively inexpensive materials and is installed without any required skill by any person that operates the automobile. The device is made of soft, resilient materials that do not subject the passenger to any discomfiture while, at the same time, the posterior of the passenger assists in wedging the device into position so that the performance of its function is enhanced.

The device is comparatively inexpensive to manufacture and is easily installed without any requisite or special skill.

These and other novel features and advantages of the present invention will be described and defined in the following specification and claims.

BRIEF DESCRIPTION OF THE DRAWINGS

FIG. 1 is a fragmentary perspective view of the interior of an automobile showing the manner in which one embodiment of the buckle-retaining apparatus of the present invention is installed in the seat of the automobile;

FIG. 2 is a greatly enlarged view taken on line 2-2 of FIG. 1;

FIG. 3 is a greatly enlarged view taken on line 3-3 of FIG. 1;

FIG. 4 is a fragmentary view of a portion of the automobile seat shown in FIG. 1 in which another embodiment of the invention is shown;

FIG. 5 is similar to FIG. 3 showing another form of fastening means in exploded relationship, for the buckle-retainer of the present invention;

FIG. 6 is similar to FIG. 5 in exploded relationship showing a further modification of said buckle-retainer; and FIG. 7 is a perspective view of a modified embodiment of a safety belt clamping plate.

DESCRIPTION OF THE PREFERRED EMBODIMENTS

Referring now to the drawing in detail, there is shown within the interior of the body of an automobile, generally designated 11, the rear seat of the automobile comprising a generally horizontal seat portion 12 and a generally vertical back portion 13, said seat 12 being removable at will from its location adjacent the lower end of the back portion 13.

The conventional safety belt apparatus comprises an automatic coiling device 16 which is anchored behind seat portion 12 and below back portion 13 to the frame of the automobile. Yieldably extending from coiling device 16 is a strap 17 of the safety belt, said strap terminating in a suitable fastening buckle element 18. Positioned along seat 12 is a coupler plate 19 of strap 21 which may also be connected to a retractor coil element similar to 16, or which is connected directly to the frame of the automobile. Coupler plate 19 mates with fastening buckle element 18 across the lap or around the waist of the passenger in the well-known safety belt arrangement. A second set of straps such as shown in 17 and 21 are arranged on another portion of seat 12 to act as a safety belt for another passenger with fastening buckle element 18 and mating coupling plate 19.

In order to ensure that buckles 18 and coupler plates 19 do not become retracted into the usually inaccessible crevice between the rear portion of seat 12 and the bottom of back 13, there is provided a retainer element of the present invention, generally designated 26, which is formed by a pair of elongated mating segments 27 and 28, said segments being made of a suitable resilient material such as polyethylene foam, foam rubber, cotton batting, or kapok or the like. In the case of some of these materials, a flexible fabric sleeve will be provided for maintaining the shape of the device where such is necessary as in the case of cotton batting or kapok.

Although segments 27 and 28 may be made in any suitable shape that will remain in the juncture between the bottom of back 13 and the rear portion of seat 12, in one preferred embodiment said segments 27 and 28 are generally tapered and when juxtaposed as shown in FIGS. 2 and 3, form a generally wedge-shaped retainer 26 which, because of the resiliency of the mass thereof, frictionally engages the juncture areas of said seat and said back and is retained in the position where it is placed.

Mounted by bonding material or otherwise applied to the inner flat surface 31 of element 27 is a panel or strip of Velcro material 32 which, in one embodiment, is formed of a mass of closely and uniformly spaced apart hooklike elements made of nylon or the like mounted on a sheet of suitable fabric. To the opposing mating surface 33 of element 28 is likewise applied a panel or strip 34 of felt or other suitable matted material which is engageable by the multitudinous Velcro hooks to releaseably secure said segments 27 and 28 firmly together. The fabric of belts 17 and 21 has a smooth or webbed surface which enables said belts to pass slidably and laterally between segments 27 and 28 by slipping freely over Velcro hooks 32 and felt strip 34 without any hindrance while, at the same time, those portions of segments 27 and 28 on both sides of belts 17 and 21 remain securely adherent to each other by the action of said Velcro hooks and said felt strip. As shown schematically in FIG. 2, when the retractor coil 16 operates to pull belt 17 downwardly, any further downward retraction of said belt is prevented when buckle element 18 abuts mated segments 27 and 28 and is prevented from passing therethrough by virtue of the bulk of said buckle. The same action takes place with belt 21 and coupling plate 19 whereby the latter is made of sufficient bulk to prevent its being pulled through segments 27 and 28. In some embodiments, coupling plate may be provided with a thickened ridge or flange 53 as shown in FIG. 7 to prevent its passage between segments 27 and 28.

Instead of providing elongated segments 27 and 28 which extend from one end of the automobile seat to the other as shown in FIG. 1, it is also contemplated that separate discrete pairs of segments 41 and 42 made of similar materials as segments 27 and 28 would be provided as shown in FIG. 4, with the same fastening means such as the Velcro 32 and felt 34 strips being mounted on the opposing mating surfaces of segments 41 and 42. A discrete pair of segments 41 and 42 would be provided for each buckle and clamping plate strap and the retaining function of said segments would be performed in the same manner as described hereinbefore for segments 27 and 28.

It will be noted that since segments 27 and 28 and segments 41 and 42 are made of soft, resilient material, passengers sitting thereon will not be subjected to any discomfiture. In actuality, the passengers sitting on these segments will ensure proper wedging action of the paired segments 27 and 28 and paired segments 41 and 42 for retention in the juncture between seat 12 and back 13.

Alternatively to the use of Velcro-felt adhering materials, it is contemplated that other fastening means may be utilized between the segments of the belt retainer such as snap fasteners comprising buttons 51 mounted on segment 27 that releaseably mate with socket elements 52 mounted on segment 28, which will permit only the fabric belt portions to move between said segments but will prevent the movement therebetween of buckle element 18 or coupler clamp 19. The opposing mating surface of segments 27 and 38 may also be provided with strips 54 of pressure sensitive frictionally engaging materials that are well known in the art, said pressure sensitive materials being disengageable at will, while at the same time permitting free movement of the fabric belts therebetween.

In operation, segment 27 is first placed on the rear surface portion of seat 12 after which straps 17 and 21 are drawn forward over said segment. Thereafter, segment 28 is superimposed over segment 27 in the manner shown in FIGS. 1 and 2 whereby the Velcro and felt securing means become engaged with each other in all areas except where said belts extend therebetween. Thus, buckles 18 and clamp plates 19 remain on top of seat 12 within easy access of the passenger and are prevented from being retracted or dislodged into the inaccessible space behind seat 12 and below seat back 13.

In another embodiment, segments 27 and 28 may be sold as a combination assembly unit by fastening the ends of said segments to each other by stitching 56 or the like so that one segment does not become completely separated from the other segment. In such an embodiment, segments 27 and 28 are urged apart manually to disengage the Velcro and felt fastening means to form slots through which belts 17 and 21 may be passed, after which said segments are pressed together on each side of said slots to form the unitary retaining device 26 as shown in FIGS. 1 and 2.

In some embodiments of the present invention, the safety belt retainer may comprise an elongated unitary assembly which is similar in appearance to the combined segments 27 and 28 but which has a plurality of slots through which straps 17 and 21 may be laced whereby the belt buckle 18 and coupler plate 19 are disposed on top of seat 12 and are prevented from being retracted through said slots because of their bulk.

While the foregoing embodiments have been described as comprising removable segments 27 and 28 that are wedged into position in the juncture between the rear of the seat and the bottom of the back rest, it is also contemplated that said segments 27 and 28 may be incorporated as original equipment in automobiles as they are manufactured so that resilient segments 27 and 28 are attached permanently to the rear of seat 12 and to the bottom of back rest 13 to perform the same function as described hereinbefore. In such original equipment embodiments, the rear portion of the seat and the bottom portion of the back rest may be formed into respective protuberances comparable to segments 27 and 28, respectively, along with the respective Velcro and felt surfacing materials thereon in order to perform the same function of retaining the seat belts as described. Here, also, as with the removable embodiments, the cross sections of segments 27 and 28 can have wedge-shaped, rectangular, oval, elliptical, or other suitable contours whereby they perform the function of preventing buckles 18 and 19 of safety belt straps 17 and 21 from being drawn back into the inaccessible space behind seat 12, so that they are readily and immediately available for use by the passengers.

Although the present invention has been described with reference to particular embodiments and examples, it will be apparent to those skilled in the art that variations and modifications can be substituted therefor without departing from the principles and true spirit of the invention.

I claim:

1. Automobile safety belt retainer comprising a pair of elongated segments, said segments being made of a resilient pliable material, the assembly of said two segments being adapted to be wedged into position in the juncture between the rear portion of the automobile seat and the lower portion of the supporting back of the seat, a plurality of slots through each of which a safety belt strap extends, the wedging of said two segments into said juncture preventing the passage of a buckle or a coupler plate on said strap therebetween while permitting the sliding movement of said strap between said segments.

2. A retainer according to claim 1 wherein the nature of the resilient pliable material causes the pair of segments to become retained in the wedged position.

3. A retainer according to claim 1 and further comprising means for releaseably securing said segments together into a unitary assembly, said means being mounted on juxtaposed opposing faces of said two segments in locations other than those through which said straps are movable slidably.

4. A retainer according to claim 1 wherein said securing means comprise a strip of Velcro material applied to the face of one of said segments and a strip of matted material mounted on the corresponding opposing face of said other segment, said Velcro material and said matted material cooperating to releaseably secure said two segments together and to permit said straps to move slidably therebetween wherever said straps are located.

5. Automobile safety belt retainer comprising a pair of elongated segments, said segments being made of a resilient pliable material, said segments having opposing juxtaposed faces, the face on one of said segments being at least partially covered with Velcro material, the corresponding opposing face of the other segment being at least partially covered with a matted material which is releaseably engaged by said Velcro material, the assembly of said two segments being adapted to be wedged into position in the juncture between the rear portion of the automobile seat and the lower portion of the supporting back of the seat, said Velcro material and said matted material being separable at discrete locations to locate a safety belt strap therebetween, the wedging of said two segments into said juncture preventing the passage of a buckle or a coupler plate on said strap therebetween while permitting the sliding movement of said strap between said segments.

6. Automobile safety belt retainer according to claim 5 wherein said pair of segments is removably urged into position in said juncture between the automobile seat and the supporting back of the seat.

7. Automobile safety belt retainer according to claim 5 wherein one of said segments is permanently mounted or formed on the rear portion of the automobile seat and the other of said segments is permanently mounted or formed on the lower portion of the supporting back of the seat.